Oct. 27, 1964    H. H. SHAW ETAL    3,154,164
OFF-HIGHWAY TRACTOR
Filed Oct. 12, 1961    4 Sheets-Sheet 3
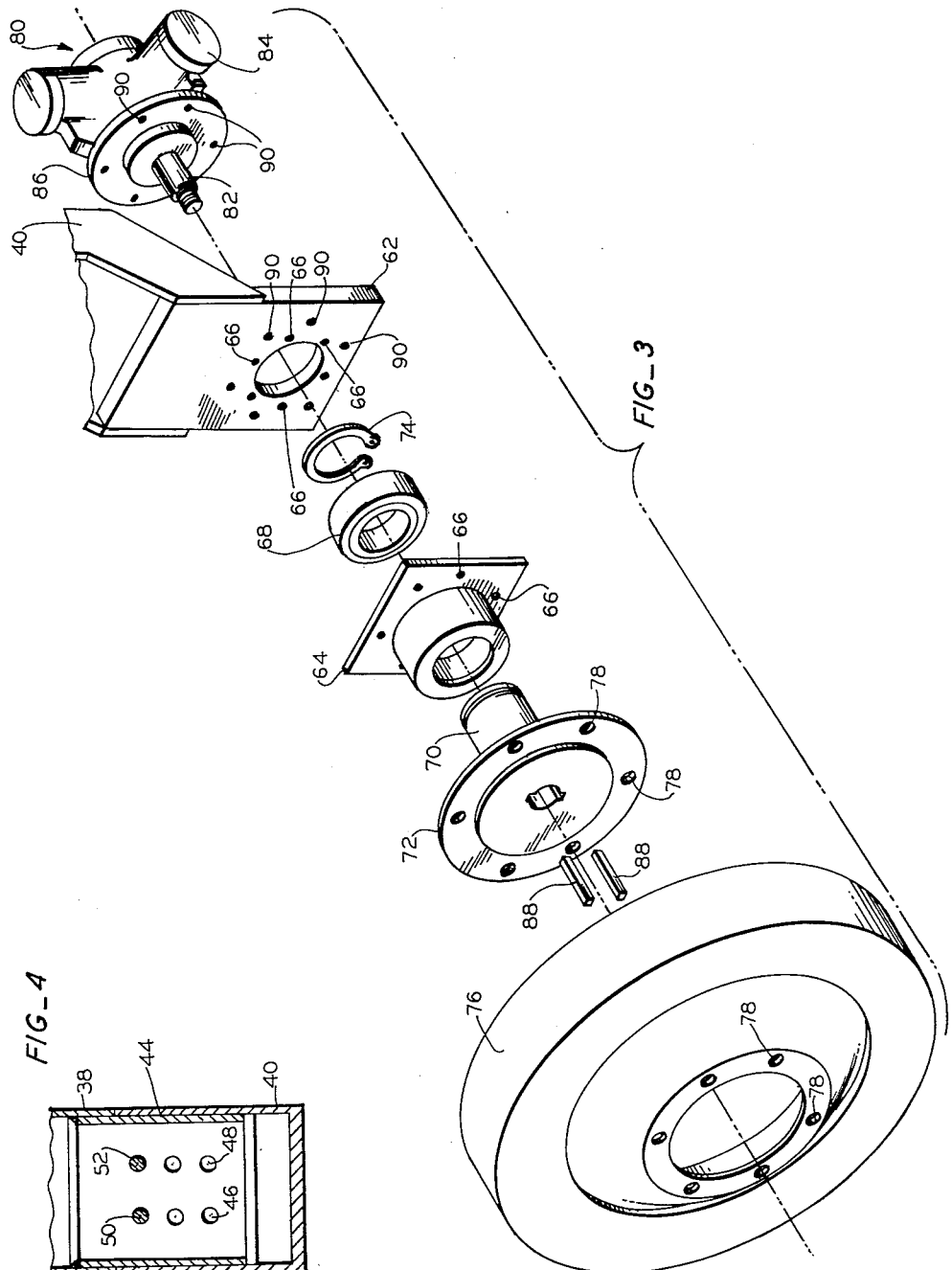
INVENTORS
HUGH H. SHAW
THOMAS R. HERRMANN
BY Naylor & Neal
ATTORNEYS Oct. 27, 1964   H. H. SHAW ETAL   3,154,164
OFF-HIGHWAY TRACTOR
Filed Oct. 12, 1961   4 Sheets-Sheet 4
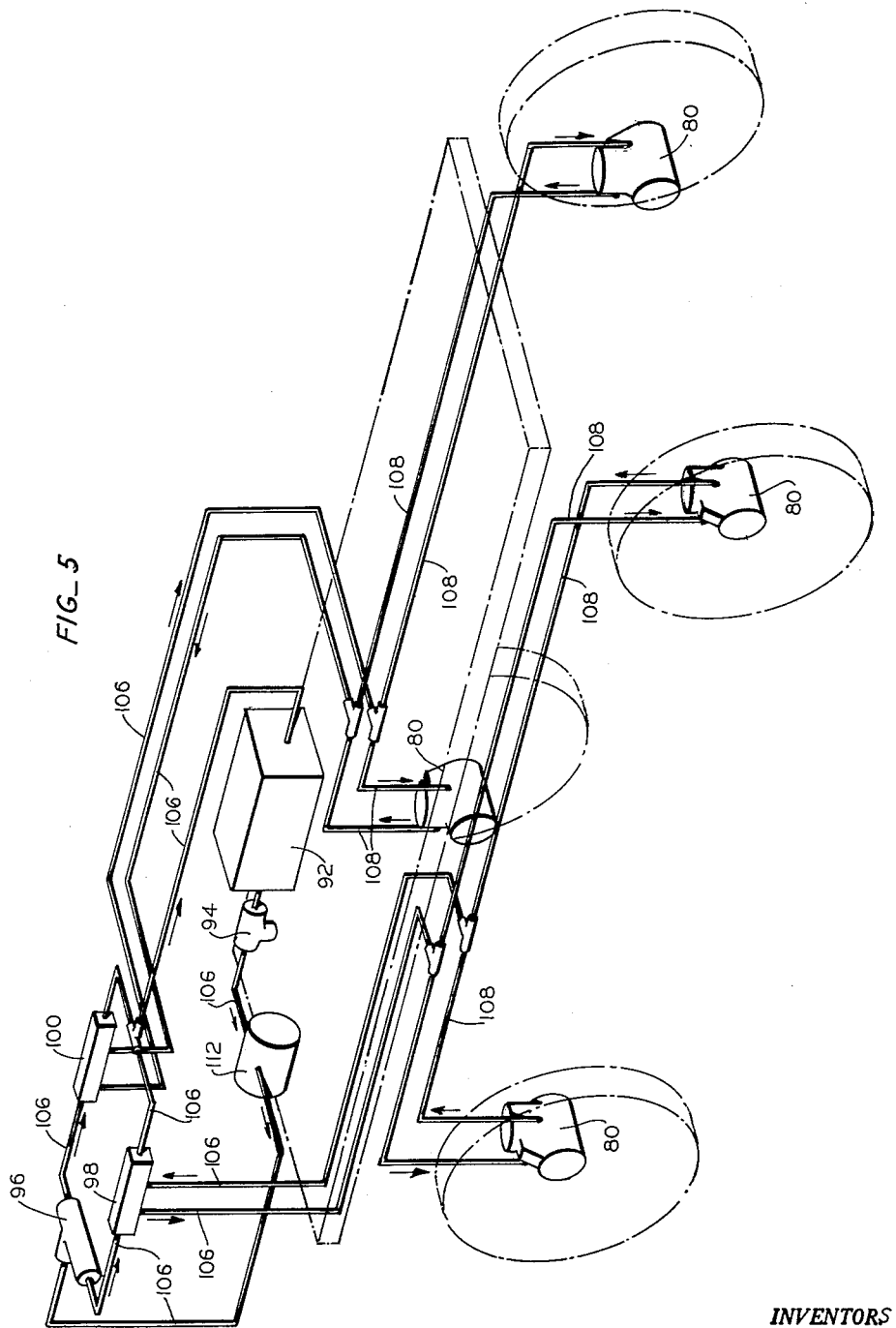
INVENTORS
HUGH H. SHAW
THOMAS R. HERRMANN
BY Naylor & Neal
ATTORNEYS

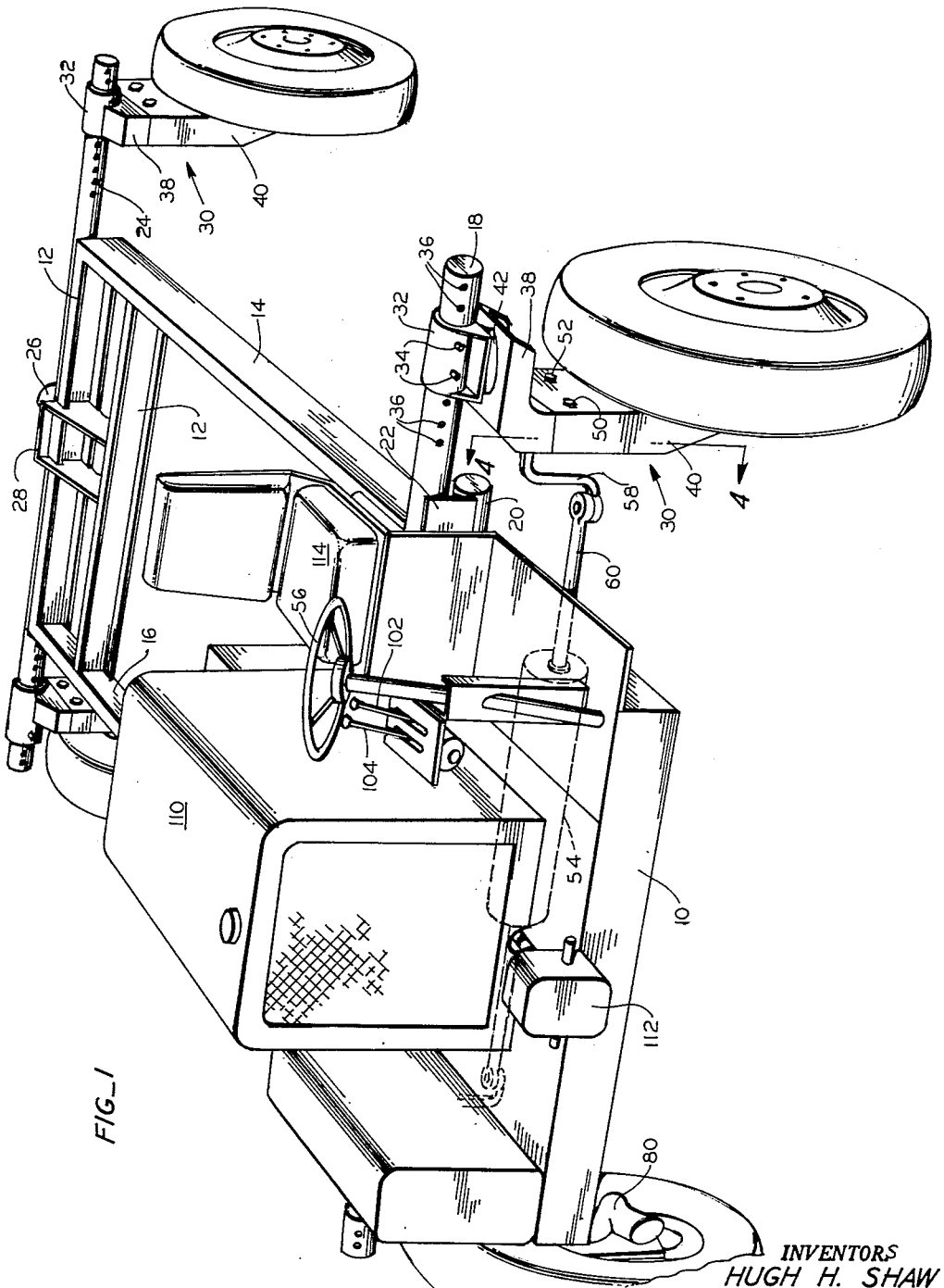

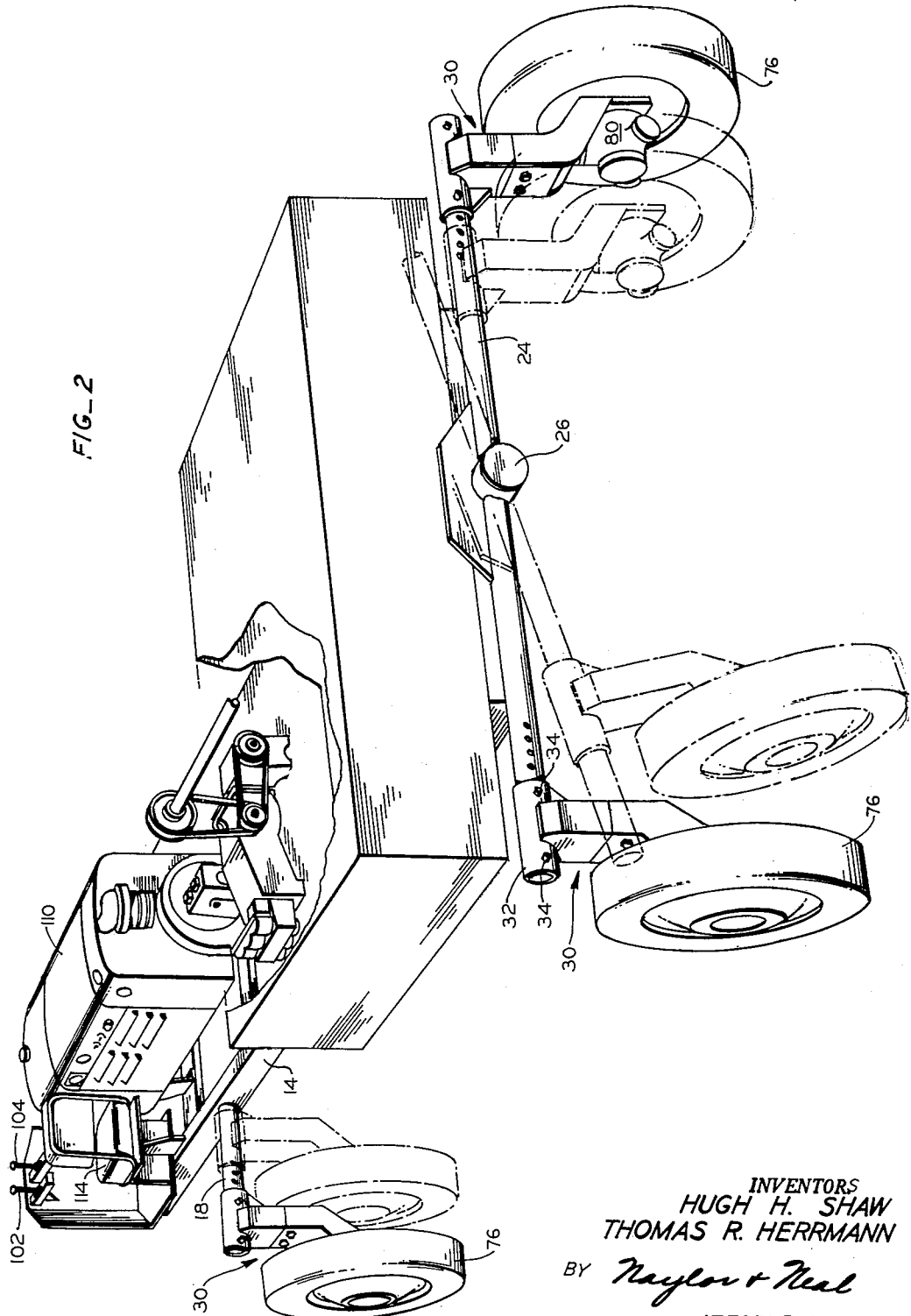

United States Patent Office 3,154,164
Patented Oct. 27, 1964

3,154,164
OFF-HIGHWAY TRACTOR
Hugh H. Shaw, Salinas, and Thomas R. Herrmann, Pacific Grove, Calif., assignors to Cochran Equipment Company, Salinas, Calif., a corporation of California
Filed Oct. 12, 1961, Ser. No. 144,616
7 Claims. (Cl. 180—44)

This invention relates to tractors and more particularly to hydraulic tractors adapted for off-highway use.

It is a principal object of this invention to provide a tractor which is particularly useful as a farm tractor.

It is another object of the invention to provide such a tractor which is particularly adapted for such off-highway uses as pulling harvesting equipment through agricultural land.

It is another object of the invention to provide such a tractor in which its drive wheels are readily adjustable for use in fields having crops of different heights and/or in fields or row crops where the rows are separated by different distances.

More specifically, it is an object of the invention to provide a tractor which may be constructed simply and inexpensively and which will have drive wheels which can be adjusted laterally and vertically with respect to the tractor's frame and in which individual power units, such as hydraulic and electric motors, are mounted on each drive wheel connected to the tractor frame by flexible means so that the wheel base and ground clearance of the tractor can be adjusted easily without interfering with the drive system.

It is another object of the invention to provide a hydraulic tractor from which the operator can guide the tractor as simply and accurately as possible through row crops while avoiding obstructions in and adjacent to the rows which might damage harvesting equipment being pulled by the tractor.

It is another object of the invention to provide such a hydraulic tractor which can be constructed as simply and economically as possible and which will be capable of supporting heavy loads.

It is another object of the invention to provide such a hydraulic tractor in which the wheels are individually driven by separate hydraulic motors and in which the motors are mounted within each of the wheels to permit movement of the wheels between rows of crops without having the wheels or motors become entangled with the crops.

It is another object of the invention to provide improved means for mounting the wheels and individual hydraulic motors on the tractor whereby the motors will support one of the load of the tractor but may provide torque for driving the wheels.

It is another object of the invention to provide such a hydraulic tractor with individual hydraulic motors for driving each wheel with the motors and wheels mounted on the vehicle so that either can be removed for adjustment or maintanence without tampering with the other.

Other objects and advantages of the invention will become apparent from the following description read in conjunction with the attached drawings, in which:

FIG. 1 is a perspective view of a hydraulic tractor constructed in accordance with this invention;

FIG. 2 is a persepctive view of an alternative form of tractor of this invention similar to FIG. 1 with the tractor being viewed from the rear;

FIG. 3 is an exploded view of the apparatus by which the wheels and hydraulic motors are mounted on the tractors of FIGS. 1 and 2;

FIG. 4 is a sectional view of the tractor of FIG. 1 taken along the plane indicated at 4—4 in FIG. 1, and FIG. 5 is a schematic diagram of the hydraulic circuit employed in the tractors of FIGS. 1 and 2.

Referring now in detail to the drawings, and particularly to FIG. 1, the tractor illustrated therein includes a main frame having front and rear structural members 10 and 12, respectively, connected by side structural members 14 and 16. A front load supporting shaft 18 is mounted on the frame with free ends of the shaft 18 protruding from opposite sides of the frame. A secondary structural member 20 is welded to the frame of the tractor and welded to the structural member 18 by a plate 22 to provide increased strength for the mounting of the structural member 18.

In this regard, it will be noted that the tractor of FIG. 2 differs from the tractor of FIG. 1 in that the member 18 in FIG. 2 does not extend continuously through the frame of the tractor but is constructed of two stub shafts. The structural member 18 may be splined to facilitate mounting of wheel struts thereon, as will appear hereinafter.

A rear structural member 24 is pivotally mounted on the frame of the tractor about a generally central horizontal axis by means of a sleeve 26 rigidly attached to the member 24 intermediate of its end and received upon a stub shaft, not shown, which is mounted on the rear structural member 12 of the frame by a bracket 28. This pivotal mounting of the rear structural member 24 provides a simple means for facilitating use of the tractor on uneven terrain.

Four wheel struts, indicated generally at 30, are mounted on the structural members 18 and 24, with one of the wheels struts 30 being mounted on each of the free ends of the structural members 18 and 24. The upper end of each wheel strut 30 carries a sleeve 32 which is slidably received on one of the structural members 18 and 24, with the sleeve 32 being internally splined where the structral members 18 and 24 are splined. The sleeves 32 are ach provided with a pair of apertures which receive tapered pins 34 with the pins extending through bores 36 in the structural members 18 and 24 to secure the sleeves 32 against sliding motion on the structural members. A series of the bores 36 are provided in the structural members 18 and 24 to permit lateral adjustment of the positions of the sleeves 32 where adjustment of the width of the wheel base of the tractor is desired.

Each of the wheel struts 30 is made of upper and lower sections 38 and 40, respectively. The upper sections 38 are connected to the sleeves 32 with a pivot joint 42 being provided between the sleeves 32 and upper section 38 of the front wheel struts of the tractor of FIG. 1 to facilitate steering of the front wheels on that tractor. As best seen in FIG. 4, an inner sleeve 44 is welded to the interior of the upper section 38 of the strut with the sleeve 44 being telescopically received in the lower section 40. The sleeve carries two vertically extending sets of apertures 46 and 48 therein which receive bolts 50 and 52 extending through the walls of the lower strut section 40. The bolts 50 and 52 may be removed and reinserted after telescopic adjustment of the upper and lower sections 38 and 40 to permit changes in the height of the tractor frame above the ground.

It is also desirable to provide strut extension sections, not shown, which have upper ends similar to the upper ends of the lower sections 40 and lower ends similar to the lower ends of the upper sections 38 of the struts so that the upper and lower sections 38 and 40 may be separated and the extension sections inserted therebetween to provide for substantial increases in the height of the tractor frame above the ground, as where it is desirable to drive the tractor over a row of a high crop such as grapes.

Steering of the front wheels of the vehicle shown in FIG. 1 is accomplished by a conventional power steering unit 54 which is controlled by a steering wheel 56 with the unit 54 being connected by operating arms 60 to steering arms 58 connected to the front wheel struts 30. The arms 60 are preferably made adjustable in length by means not shown to provide for corresponding adjustment in the arms 60 when the sleeves 32 are moved on the structural members 18, and the steering arms 58 are preferably connected to the upper sections 38 of the front wheel struts 30 to facilitate adjustment of the height of the vehicle frame above the ground.

The wheels of the vehicle and their individual hydraulic motors can be mounted on the struts 30 by a variety of means while obtaining the advantages of the structure described above, but the mounting structure shown in FIG. 3 provides many advantages in the tractor which may not be provided by other mounting structures.

Referring specifically to FIG. 3, the preferred means by which tractor wheels and hydraulic motors are mounted on the wheel struts 30 are illustrated therein and comprise an apertured plate 62 on the lower end of the lower wheel strut section 40 with a bearing support bracket 64 bolted thereto by bolts not shown which pass through apertures 66 in the plate 62 and bracket 64. A bearing 68, which is preferably a heavy duty roller bearing, is received in the bracket 64, and a wheel hub having a stem 70 and a flange 72 is mounted in the bearing with the stem 70 received in the bearing 68 and retained therein by a snap ring 74. A conventional tractor wheel 76 is bolted to the flange 72 by bolts which extend through apertures 78 in the wheel rim and flange 72. The apertures 78 in the flange 72 are preferably tapped to permit simple removal of the wheel from the hub. It will be noted that the elements thus far described in FIG. 3 provide complete means for mounting the wheels 76 on the tractor with the wheel carrying the full load which is applied to the strut 30.

A hydraulic motor 80 is provided for each of the wheels of the vehicle. The motor 80 having any desired design whereby a rotary shaft 82 rotates in a motor body portion 84 responsive to the delivery of fluid under pressure to the motor. The shaft 82 protrudes from one side of the body portion 84 and is surrounded by a flange 86 integrally cast with the body portion 84 of the motor. As indicated in FIG. 3, the stem 70 of the wheel hub is hollow and receives the rotary shaft 82 of the motor 80 when the motor 80 is attached to the plate 62 of the wheel strut. A pair of keys 88 is provided for connecting the shaft 82 and the stem 70 for rotation together, the keys 88 being retained in place by a washer not shown and a nut, with the nut being received on the threaded end of the shaft 82. The hydraulic motor 80 is mounted on the wheel strut 30 by bolts not shown which pass through apertures 90 in the flange 86 and plate 62, the apertures 90 in the plate 62 preferably being tapped to facilitate removal of the bolts therefrom from the motor side of the plate 62. The apertures 90 in the plate 62 are radially spaced from the apertures 66. It should be noted that this structure permits the motor 80 to be removed from the wheel struts by removal of the bolts in its apertures 90 and the nut on its threaded shaft 82 without disturbing the mounting of the wheel 76 on the wheel strut. Additionally, the wheel may be removed from the strut by removal of the bolts in apertures 78 without disturbing the mounting of the hydraulic motor.

Fluid is supplied under pressure to all of the hydraulic motors 80 through the fluid conduit means illustrated in FIG. 5. The fluid conduit means includes a reservoir 92, a filter 94, a flow distributing valve 96, and two flow control valves 98 and 100. The flow control valves 98 and 100 have manipulating handles 102 and 104, respectively (see FIG. 1), and the valves 98 and 100 control the supply of hydraulic fluid to the left and right sides of the vehicle, respectively through flexible tubing (not shown). Additionally, a manually adjustable distributing valve 96 may be employed for proportioning fluid flow to the motors on the two sides of the tractor.

Rigid conduits 106 interconnect these elements, as indicated in FIG. 5, and flexible conduits 108 connect the rigid conduits 106 to the hydraulic motors 80, the flexible conduits 108 permitting adjustment of the relative positions of the vehicle's wheels without interfering with the hydraulic system. A prime mover, suitably an internal combustion engine, 110, is mounted on the frame of the tractor and connected to a centrifugal hydraulic pump 112 with the hydraulic pump being connected in the fluid conduit system between the filter 94 and the flow divider 96. The valves 98 and 100 are conventional four-position valves employed with individual wheel hydraulic motors of this type which in their four positions permit forward, reverse and neutral operation of the motors and locking of the motors against operation.

The tractor shown in FIG. 2 is operated simply by manipulation of the valves 98 and 100 (and the valve 96 where an adjustable valve 96 is used) with steering of the tractor being accomplished by operating the wheels on opposite sides of the tractor at different speeds and/or directions. In addition to this manner of steering employed with the tractor of FIG. 2, the tractor of FIG. 1 may be steered with the steering wheel 56 so that the tractor of FIG. 1 may be operated through very small radius turns.

An operator's seat 114 is provided on the tractor frame immediately adjacent to the front end of the tractor frame and facing away from the rear end with the steering wheel 56 and the manipulating handles 102 and 104 of the valves 98 and 100 being located within easy reach of an operator sitting on the seat 114. The seat 114 and the steering controls thus define an operator's station at the front of the tractor where the operator is in a position to inspect a row of crops passing between the wheels of the tractor. The operator's station may be located centrally of the tractor with the prime mover 110 and the pump 112 being located behind the operator's station; however, it is preferred that the operator's station be located at one of the front corners of the tractor with the operator thereby permitted good visibility of harvesting equipment being pulled by the tractor.

For special applications where the tractor pulls large harvesting machines which have their own power systems, the tractor may be driven by the power system of the harvesting machine with flexible conduits extending from the tractor to a hydraulic pump on the harvesting machine.

It will be obvious from the above description that the hydraulic tractors disclosed herein are capable of a manner of operation not obtainable with tractors employed heretofore, particularly where the tractor is used for pulling harvesting equipment in irrigated fields of row crops. In addition to the basic structures of the tractors described above, the tractor may be provided with conventional auxiliary equipment such as a load-carrying platform and a power take-off, as illustrated in FIG. 2.

While two specific embodiments of the invention have been described in detail herein, it is obvious that many modifications of the invention may be made without departing from the spirit and scope thereof.

We claim:

1. A hydraulic tractor adapted for off-highway use which comprises: a frame having front and rear ends and sides extending between said ends, two pairs of ground engaging wheels on said frame, one pair mounted adjacent to each side of said frame for moving said frame in the direction said front end faces responsive to rotation of said wheels, an operator's station on said frame adjacent to said front end thereof and including a seat for supporting an operator with the operator facing away from said rear end of said frame, four hydraulic motors, one connected between each of said wheels and said frame for effecting rotation of said wheels responsive to the delivery of fluid under pressure to said motors, power means mounted on said frame and including a pump for delivering fluid under pressure, and conduit means connecting said pump to said motors for conducting fluid under pressure from said pump to said motors including manually operable control valve means for controlling the flow of fluid in said conduit means with said valve means having at least one manipulating handle mounted on said frame at said operator's station within reach of said seat, said tractor being characterized further in that four wheel struts are mounted on said frame, one extending between said frame and each of said wheels; each of said motors has a body portion and a rotary shaft mounted therein, and one of said motors and one of said wheels are mounted on each of said struts by means comprising: a load supporting bearing mounted on said strut and having a generally horizontal interior bore therethrough, a wheel hub having a hollow stem received in said bore and contacting said bearing to support loads transmitted to said hub from said strut by said bearing, said hub having a flange thereon at one end of said strut, attaching means for attaching said wheel to said flange, second attaching means operable independently of said first attaching means for attaching said body portion of said motor to the side of said strut remote from said flange with said rotary shaft received in said stem of said hub whereby said motor and said wheel may be removed from said strut independently of each other, and key means connecting said rotary shaft to said hub.

2. The tractor of claim 1 characterized further by said struts having adjustable attachment means for securing said wheels in a plurality of alternative positions spaced apart vertically and laterally, and a portion of said conduit means is formed of flexible tubing.

3. The hydraulic tractor of claim 1 characterized further in that said conduit means defines two fluid conducting paths with one path connecting each of said pairs of motors to said pump; said valve means includes a manually operable valve in each of said fluid conducting paths for controlling fluid flow in said paths with each of said valves having a manipulating handle at said operator's station; the four wheels on said vehicle are divided into forward and rearward pairs with said forward pair adjacent to said operator's station, and steering means are connected to said forward pair of wheels for pivoting the wheels of said forward pair about generally vertical axes.

4. A hydraulic tractor adapted for off-highway use which comprises a frame, a pair of elongated transverse load supporting members mounted on said frame and each having opposed free ends projecting from opposite sides of said frame, a pair of wheel struts mounted on each of said support members, one strut adjacent to each of said free ends thereof, adjustable connecting means interconnecting each of said struts to the one support member on which it is mounted for securing said strut to said one support member in a plurality of alternative positions spaced along the length of said one support member, each of said struts depending from one of said support members and having upper and lower sections and means adjustably interconnecting said sections for securing the lower section to the upper section in a plurality of alternative positions spaced apart along a direction generally perpendicular to the length of the support member, a ground engaging wheel supported on each of said lower sections of said struts, a hydraulic motor interconnecting each of said wheels with the strut on which it is mounted for effecting rotation of said wheel responsive to delivery of fluid under pressure to the motor, power means mounted on said frame and including a pump for supplying fluid under pressure, and flexible conduit means connecting said pump to said motors.

5. In a vehicle having a chassis with a wheel supporting strut thereon, a ground engaging wheel supported on said chassis, and a hydraulic motor interconnecting said wheel and strut for effecting rotation of said wheel responsive to the delivery of fluid under pressure to said motor with said motor having a body portion and a rotary shaft mounted in said body portion and extending therefrom, the improved means for mounting said motor and said wheel on said strut which comprises: a load supporting bearing mounted on said strut and having a hollow interior, a wheel hub having a hollow stem with said stem received in said hollow interior of said bearing and contacting said bearing to support loads transmitted to said hub from said strut by said bearing, means for attaching said wheel to said hub, means mounting said body portion of said motor on said strut with said rotary shaft received in said hollow stem of said hub, and key means connecting said rotary shaft to said hub for effecting rotation of said stem in said bearing responsive to rotation of said shaft in said body portion.

6. In a vehicle having a chassis with a wheel supporting strut thereon, a ground engaging wheel supported on said strut, and a hydraulic motor interconnecting said wheel and said strut for effecting rotation of said wheel responsive to the delivery of fluid under pressure to said motor with said motor having a body portion and a rotary shaft mounted in said body portion and extending therefrom, the improved means for mounting said motor and said wheel on said strut which comprises: a load supporting bearing mounted on said strut and having a generally horizontal interior bore therethrough, a wheel hub having a hollow stem received in said bore and contacting said bearing to support loads transmitted to said hub from said strut by said bearing, said hub having a flange thereon at one end of said strut, attaching means for attaching said wheel to said flange, second attaching means operable independently of said first attaching means for attaching said body portion of said motor to the side of said strut remote from said flange with said rotary shaft received in said stem of said hub whereby said motor and said wheel may be removed from said strut independently of each other, and key means connecting said rotary shaft to said hub.

7. A hydraulic tractor adapted for off-highway use which comprises, a tractor frame, a pair of wheel struts on each side of said frame, a ground engaging wheel on the lower end of each of said struts with the two wheels on each side of said frame positioned to track each other when they roll responsive to movement of said frame, a hydraulic motor interconnecting each of said wheels with the strut on which it is mounted for effecting rotation of said wheel responsive to delivery of fluid under pressure to the motor, power means mounted on said frame and including a pump for supplying fluid under pressure, flexible conduit means connecting said pump to said motors, adjustable connecting means connecting said struts to said frame for moving said pairs of struts toward and away from each other to adjust the width of the wheel base of said tractor, and adjustable means forming a part of said struts for changing the lengths of said struts for adjusting the ground clearance of said frame above the ground, whereby said tractor may be operated straddling different row crops which grow to different heights and are planted at different spacings between rows.

References Cited in the file of this patent

UNITED STATES PATENTS

| 1,977,033 | Adams | Oct. 16, 1934 |
| 2,228,411 | Sheridan | Jan. 14, 1941 |
| 2,355,604 | Rupp | Aug. 15, 1944 |
| 2,544,521 | Bergen | Mar. 6, 1951 |
| 2,669,317 | Celien | Feb. 16, 1954 |
| 2,749,137 | Thomsen et al. | June 5, 1956 |
| 2,771,958 | Ball | Nov. 27, 1956 |
| 2,788,858 | Aasland et al. | Apr. 16, 1957 |

FOREIGN PATENTS

| 1,234,819 | France | May 23, 1960 |